(12) United States Patent
Qin et al.

(10) Patent No.: US 11,823,025 B1
(45) Date of Patent: Nov. 21, 2023

(54) BATTERY CHARGING METHOD AND APPARATUS, AND DEVICE AND MEDIUM

(71) Applicant: INSPUR SUZHOU INTELLIGENT TECHNOLOGY CO., LTD., Jiangsu (CN)

(72) Inventors: Qingsong Qin, Jiangsu (CN); Lei Liang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/265,245

(22) PCT Filed: Oct. 29, 2021

(86) PCT No.: PCT/CN2021/127512
§ 371 (c)(1),
(2) Date: Jun. 2, 2023

(87) PCT Pub. No.: WO2023/284167
PCT Pub. Date: Jan. 19, 2023

(30) Foreign Application Priority Data

Jul. 16, 2021 (CN) .......................... 202110803770.X

(51) Int. Cl.
*H01M 10/633* (2014.01)
*G06N 3/0464* (2023.01)
(Continued)

(52) U.S. Cl.
CPC ............ *G06N 3/0464* (2023.01); *G06N 3/08* (2013.01); *H01M 10/44* (2013.01);
(Continued)

(58) Field of Classification Search
CPC ..... G06N 3/0464; G06N 3/08; H01M 10/633; H01M 10/44; H02J 7/00714; H02J 7/0047
(Continued)

(56) References Cited

U.S. PATENT DOCUMENTS

2018/0247181 A1* 8/2018 Brew ................ H01M 10/425
2020/0074297 A1* 3/2020 Lee ........................ G06N 3/042

FOREIGN PATENT DOCUMENTS

CN 1890574 A 1/2007
CN 109655751 A 4/2019
(Continued)

*Primary Examiner* — Nathaniel R Pelton
(74) *Attorney, Agent, or Firm* — IPro, PLLC

(57) ABSTRACT

Disclosed in the present application are a battery charging method and apparatus, and a device and a medium. The method includes; collecting, at a preset time interval, battery charging state data of a rechargeable battery within each of the preset time intervals in real time; when the battery charging state data within any one of the preset time intervals is collected, using the battery charging state data within the preset time interval as a training data set, inputting the training data set to an initial neural network model for training, and during the process of training, updating a preset network parameter on the basis of the difference value between a model output value corresponding to each piece of battery charging state data and a preset threshold until difference value between model output value corresponding to present battery charging state data and the preset threshold meets a preset error condition.

20 Claims, 4 Drawing Sheets

(51) Int. Cl.
    *H01M 10/44*     (2006.01)
    *G06N 3/08*     (2023.01)
    *H02J 7/00*     (2006.01)

(52) U.S. Cl.
    CPC ......... *H01M 10/633* (2015.04); *H02J 7/0047* (2013.01); *H02J 7/00714* (2020.01)

(58) Field of Classification Search
    USPC ........................................................ 320/152
    See application file for complete search history.

(56) References Cited

FOREIGN PATENT DOCUMENTS

| | | | |
|---|---|---|---|
| CN | 111313500 A | 6/2020 | |
| CN | 112018854 A | 12/2020 | |
| CN | 112602226 A | 4/2021 | |
| CN | 113258154 A | 8/2021 | |

\* cited by examiner

BATTERY CHARGING METHOD AND APPARATUS, AND DEVICE AND MEDIUM

CROSS-REFERENCE TO RELATED APPLICATION

This application claims the priority of the Chinese Patent application filed on Jul. 16, 2021 before the China National Intellectual Property Administration with the application number of 202110803770.X, and the title of "METHOD FOR CHARGING BATTERY, APPARATUS, DEVICE AND MEDIUM", which is incorporated herein in its entirety by reference.

FIELD

The present disclosure relates to the technical field of battery and, more particularly, to a method for charging a battery, an apparatus, a device and a medium.

BACKGROUND

With the widespread use of electric energy in such as electric vehicles, servers, laptops, etc., charging safety issues raise therewith. At present, many devices used by users occur spontaneous combustion when using chargers, which even endanger the problems of personal safety. The cause of charging safety accidents is usually the unstable current during charging, which leads to the failure of the internal structure of the battery, and the unstable current affects the life of the battery.

SUMMARY

In view of this, the objective of the present disclosure is to provide a method for charging a battery, an apparatus, a device and a medium, which is capable of stabilizing the charging current, thus the life of the battery and the safety of charging are improved. The solution is as follows:

In a first aspect, the present disclosure discloses a method for charging a battery, including:
  collecting, at preset time intervals, battery charging state data of a rechargeable battery within each of the preset time intervals in real time; wherein the battery charging state data at least includes charging current data;
  after the battery charging state data within any one of the preset time intervals are collected, regarding the battery charging state data within the preset time interval as a training data set and inputting into an initial neural network model for training; and in the process of training, updating a preset network parameter based on a difference between a model output value corresponding to each piece of the battery charging state data and a preset threshold, until the difference between the model output value corresponding to current battery charging state data and the preset threshold meets a preset error condition, and then regarding a current preset network parameter as a target parameter; and
  controlling charging current flowing into the rechargeable battery according to the target parameter.

In some embodiments, controlling the charging current flowing into the rechargeable battery according to the target parameter includes:
  adjusting a variable resistance according to the target parameter to control the charging current flowing into the rechargeable battery.

In some embodiments, collecting, at the preset time intervals, the battery charging state data of the rechargeable battery within each of the preset time intervals in real time includes:
  collecting, at the preset time intervals, the charging current data and the battery temperature data of the rechargeable battery within each of the preset time intervals in real time.

Accordingly, after the battery charging state data within any one of the preset time intervals are collected, regarding the battery charging state data within the preset time interval as the training data set and inputting into the initial neural network model for training, and in the process of training, updating the preset network parameter based on the difference between the model output value corresponding to each piece of the battery charging state data and the preset threshold, until the difference between the model output value corresponding to current battery charging state data and the preset threshold meets the preset error condition, and then regarding the current preset network parameter as the target parameter includes:
  when collecting the charging current data and battery temperature data within any one of the preset time intervals, regarding the charging current data and the battery temperature data within the preset time interval as the training data set, inputting into the initial neural network model for training, and in the process of training, updating a preset network current parameter based on a difference between the model output value corresponding to each piece of the charging current data and a preset current threshold, and updating a preset network temperature parameter based on a difference between the model output value corresponding to each of the battery temperature data and a preset temperature threshold, until the difference between the model output value corresponding to current charging current data and the preset current threshold meets a preset current error condition, and the difference between the model output value corresponding to the current battery temperature data and the preset temperature threshold meets a preset temperature error condition, and then regarding a current preset network current parameter as a target current parameter and regarding a current preset network temperature parameter as a target temperature parameter.

In some embodiments, adjusting the variable resistance according to the target parameter to control the charging current flowing into the rechargeable battery includes:
  adjusting a first variable resistance according to the target current parameter to control current flowing into the rechargeable battery; and
  adjusting a second variable resistance according to the target temperature parameter to control a temperature of the rechargeable battery.

In some embodiments, adjusting the first variable resistance according to the target current parameter to control the current flowing into the rechargeable battery; and adjusting the second variable resistance according to the target temperature parameter to control the temperature of the rechargeable battery include:
  determining a difference between the target current parameter and the preset current threshold, and adjusting the first variable resistance according to the difference to control the current flowing into the rechargeable battery; and
  determining a difference between the target temperature parameter and the preset temperature threshold, adjusting the second variable resistance according to the difference to control the temperature of the rechargeable battery.

In some embodiments, after regarding the current preset network parameter as the target parameter, the method further includes:

storing the target parameter to a preset model file;

accordingly, according to the target parameter, controlling the charging current flowing into the rechargeable battery includes:

reading the target parameter from the preset model file and according to the target parameter, controlling the charging current flowing into the rechargeable battery.

In some embodiments, after the battery charging state data within any one of the preset time intervals are collected, regarding the battery charging state data within the preset time interval as the training data set includes:

after the battery charging state data within any one of the preset time intervals are collected, constructing the battery charging state data within the preset time interval as a data matrix, and regarding the data matrix as the training data set.

In a second aspect, the present disclosure discloses an apparatus for charging a battery, including:

a data collecting module configured for collecting, at preset time intervals, battery charging state data of a rechargeable battery within each of the preset time intervals in real time;

wherein the battery charging state data at least includes charging current data;

a module training module configured for, after the battery charging state data within any one of the preset time intervals are collected, regarding the battery charging state data within the preset time interval as a training data set and inputting into an initial neural network model for training; and in the process of training, updating a preset network parameter based on a difference between a model output value corresponding to each piece of the battery charging state data and a preset threshold, until the difference between the model output value corresponding to current battery charging state data and the preset threshold meets a preset error condition, and then regarding a current preset network parameter as a target parameter; and a current controlling module configured for controlling charging current flowing into the rechargeable battery according to the target parameter.

In a third aspect, the present disclosure discloses an electronic device, including:

a memory configured for saving a computer program; and a processor configured for executing the computer program to implement the method for charging the battery stated above.

In a fourth aspect, the present disclosure discloses a computer-readable storage medium, wherein the computer-readable storage medium is configured for saving a computer program, the computer program, when executed by a processor, implements the method for charging the battery stated above.

It may be seen that in the present disclosure, at preset time intervals, battery charging state data of a rechargeable battery is collected within each of the preset time intervals in real time; wherein the battery charging state data at least includes charging current data; when the battery charging state data within any one of the preset time intervals is collected, the battery charging state data within the preset time interval is regarded as a training data set and input into an initial neural network model for training; and in the process of training, a preset network parameter is updated based on a difference between a model output value corresponding to each piece of the battery charging state data and a preset threshold, until the difference between the model output value corresponding to current battery charging state data and the preset threshold meets a preset error condition, and then a current preset network parameter is regarded as a target parameter; and charging current flowing into the rechargeable battery is controlled according to the target parameter. In other words, in the present disclosure, at the preset time intervals, the battery charging state data is collected in real time and the battery charging state data training model within each of the preset time intervals is used to obtain the network parameters corresponding to the rechargeable battery state data in this period. According to the network parameters, the charging current flowing into the rechargeable battery is controlled. In this way, the network parameters are obtained according to the data training model collected in real time, and the charging current flowing into the rechargeable battery is controlled in real time according to the network parameters, which is capable of stabilizing the charging current, thus the life of the battery and the safety of charging are improved.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other embodiments according to these drawings without involving any inventive effort.

DETAILED DESCRIPTION

In the following, the technical solution of the embodiment of the present disclosure may be clearly and completely described in combination with the drawings of the embodiment of the present disclosure. Obviously, the embodiment described is only a part of the embodiments of the present disclosure, not the whole embodiments. Based on the embodiments in the present disclosure, all other embodiments obtained by a person of ordinary skill in the art without making creative labor belong to the scope of protection of the present disclosure.

At present, many devices used by users occur spontaneous combustion when using chargers, which even endanger the problems of personal safety. The cause of charging safety accidents is usually the unstable current during charging, which leads to the failure of the internal structure of the battery, and the unstable current affects the life of the battery.

For this, the present disclosure provides a solution for charging a battery, which is capable of stabilizing the charging current, thus the life of the battery and the safety of charging are improved.

Figure 1:
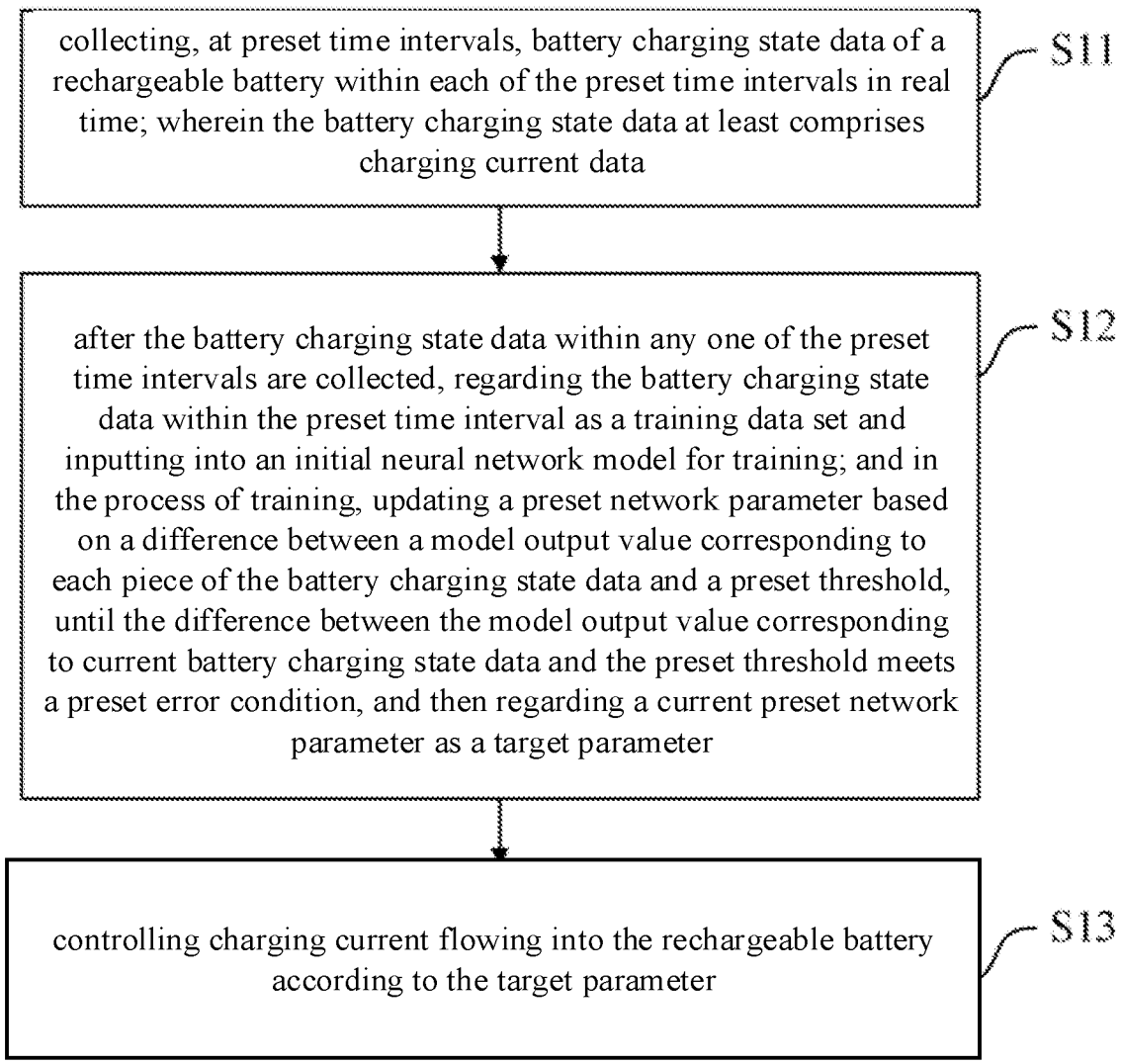
FIG. 1 is a flow chart of a method for charging a battery disclosed in the present disclosure.

Referring to FIG. 1, the embodiments of the present disclosure disclose a method for charging a battery, including:

Step S11, collecting, at preset time intervals, battery charging state data of a rechargeable battery within each of the preset time intervals in real time; wherein the battery charging state data at least includes charging current data.

For example, the preset time intervals may be set to be 10 minutes and the battery charging state data in the past 10 minutes is collected every 10 minutes.

Step S12, after the battery charging state data within any one of the preset time intervals are collected, regarding the battery charging state data within the preset time interval as a training data set and inputting into an initial neural network model for training; and in the process of training, updating a preset network parameter based on a difference between a model output value corresponding to each piece of the battery charging state data and a preset threshold, until the difference between the model output value corresponding to current battery charging state data and the preset threshold meets a preset error condition, and then regarding a current preset network parameter as a target parameter.

The initial neural network model may be convolutional neural networks (CNN), which are predefined.

It should be pointed out that the network parameters obtained by training the neural network model may accurately represent the battery charging state data in the past preset time interval and has a high speed.

In an embodiment, when the battery charging state data within any one of the preset time intervals is collected, the battery charging state data within the preset time interval is constructed as a data matrix, and the data matrix is regarded as the training data set.

The NumPy may be used as an open source tool to construct the battery charging state data as the data matrix.

Step S13, controlling charging current flowing into the rechargeable battery according to the target parameter.

In an embodiment, variable resistance may be adjusted according to the target parameter to control the charging current flowing into the rechargeable battery.

In an embodiment, the target parameter may be stored in the preset model file.

Accordingly, the charging current flowing into the rechargeable battery is controlled according to the target parameter, including: reading the target parameter from the preset model file and according to the target parameter, controlling the charging current flowing into the rechargeable battery.

It may be seen that, in the embodiments of the present disclosure, at preset time intervals, battery charging state data of a rechargeable battery is collected within each of the preset time intervals in real time; wherein the battery charging state data at least includes charging current data; when the battery charging state data within any one of the preset time intervals is collected, the battery charging state data within the preset time interval is regarded as a training data set and input into an initial neural network model for training; and in the process of training, a preset network parameter is updated based on a difference between a model output value corresponding to each piece of the battery charging state data and a preset threshold, until the difference between the model output value corresponding to current battery charging state data and the preset threshold meets a preset error condition, and then a current preset network parameter is regarded as a target parameter; and charging current flowing into the rechargeable battery is controlled according to the target parameter. In other words, in the present disclosure, at the preset time intervals, the battery charging state data is collected in real time and the battery charging state data training model within each of the preset time intervals is used to obtain the network parameters corresponding to the rechargeable battery state data in this period. According to the network parameters, the charging current flowing into the rechargeable battery is controlled. In this way, the network parameters are obtained according to the data training model collected in real time, and the charging current flowing into the rechargeable battery is controlled in real time according to the network parameters, which is capable of stabilizing the charging current, thus the life of the battery and the safety of charging are improved.

Figure 2:
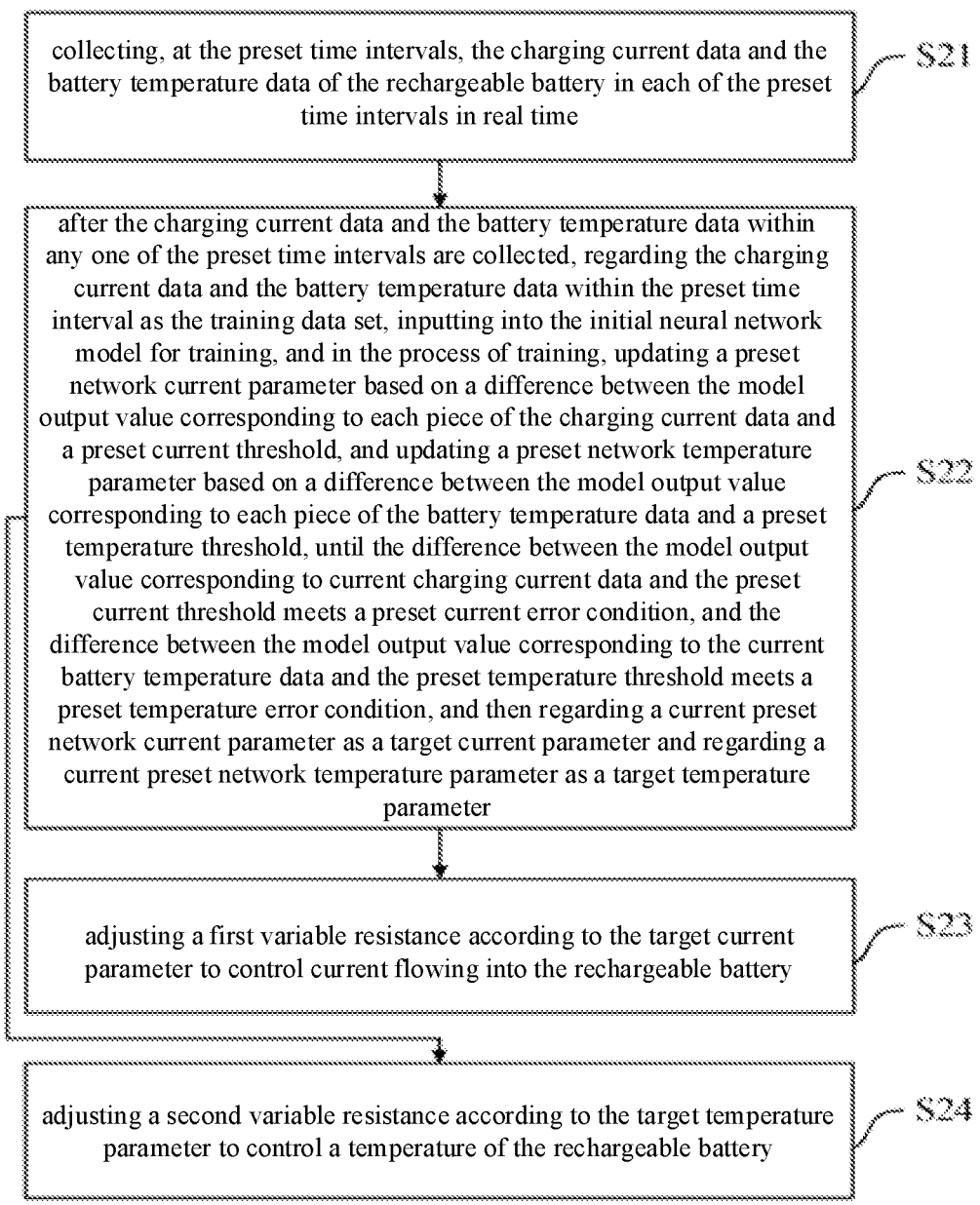
FIG. 2 is a flow chart of a method for charging the battery disclosed in an embodiment of the present disclosure.

Referring to FIG. 2, the embodiments of the present disclosure disclose a method for charging the battery, including:

Step S21: collecting, at the preset time intervals, the charging current data and the battery temperature data of the rechargeable battery within each of the preset time intervals in real time.

Step S22: when collecting the charging current data and battery temperature data within any one of the preset time intervals, regarding the charging current data and the battery temperature data within the preset time interval as the training data set, inputting into the initial neural network model for training, and in the process of training, updating a preset network current parameter based on a difference between the model output value corresponding to each piece of the charging current data and a preset current threshold, and updating a preset network temperature parameter based on a difference between the model output value corresponding to each of the battery temperature data and a preset temperature threshold, until the difference between the model output value corresponding to current charging current data and the preset current threshold meets a preset current error condition, and the difference between model output value corresponding to the current battery temperature data and the preset temperature threshold meets a preset temperature error condition, and then regarding a current preset network current parameter as a target current parameter and regarding a current preset network temperature parameter as a target temperature parameter.

For example, that the preset current threshold is 3 A, the error is less than or equal to 0.25 A meets the current error condition. That the preset temperature threshold is 60 degrees, the error is less than or equal to 1 degree meets the temperature error condition.

Step S23: adjusting a first variable resistance according to the target current parameter to control current flowing into the rechargeable battery.

Step S24: adjusting a second variable resistance according to the target temperature parameter to control a temperature of the rechargeable battery.

In an embodiment, a difference between the target current parameter and the preset current threshold is determined, the first variable resistance is adjusted according to the difference to control the current flowing into the rechargeable battery. And a difference is determined between the target temperature parameter and the preset temperature threshold, the second variable resistance is adjusted according to the difference to control the temperature of the rechargeable battery.

In an embodiment, the difference between the target current parameter and the preset current threshold may be determined, and the difference is compared with a preset first difference threshold. If the target current parameter is greater than the preset current threshold and the difference is greater than the preset first difference threshold, the resistance value of the first variable resistance is increased, to reduce the current flowing into the rechargeable battery. If the target current parameter is less than the preset current threshold, and the difference is greater than the preset difference condition, the resistance value of the first variable resistance is lowered to increase the current flowing into the rechargeable battery.

The difference between the target temperature parameter and the preset temperature threshold is determined, the second variable resistance is adjusted according to the difference, and the difference is compared with the preset second difference threshold. If the target temperature parameter is greater than the preset temperature threshold and the difference is greater than the preset second difference threshold, the resistance value of the second variable resistance is increased to reduce the temperature of the rechargeable battery.

Figure 3:
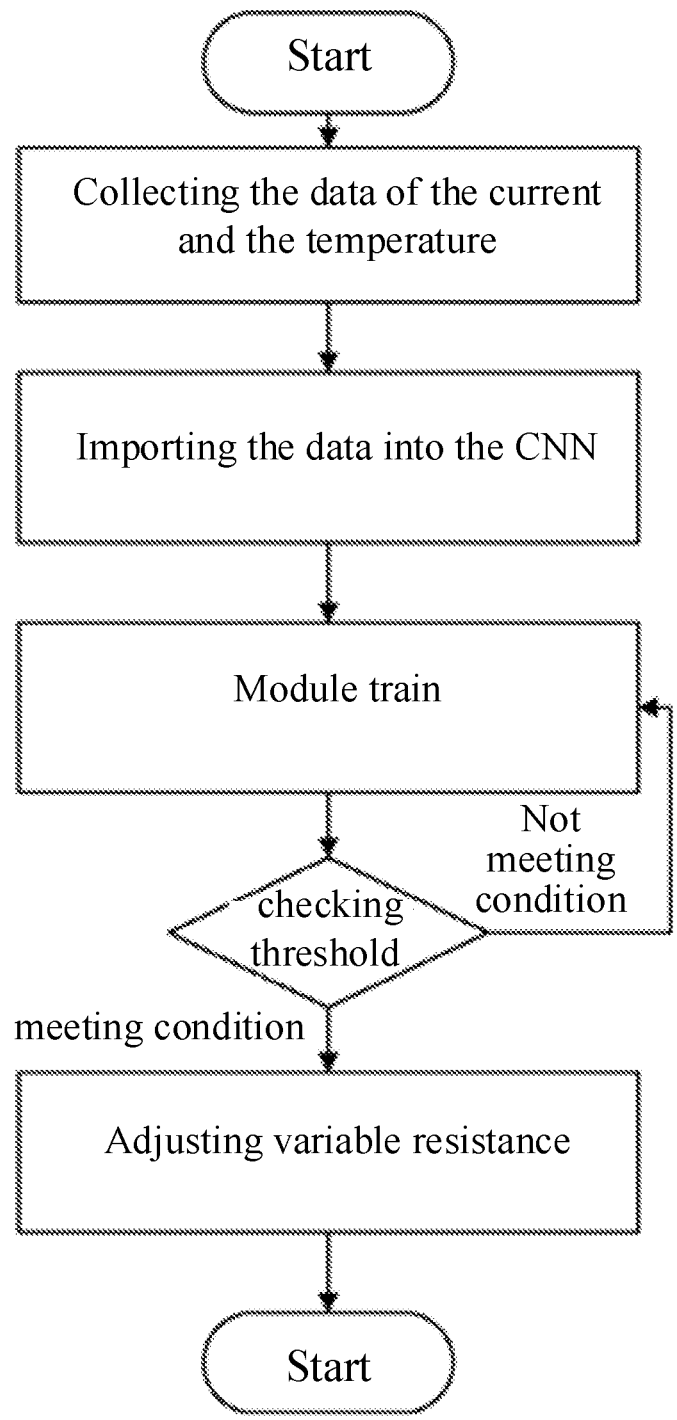
FIG. 3 is a flow chart of a method for charging the battery disclosed in an embodiment of the present disclosure.

Referring to FIG. 3, the embodiments of the present disclosure disclose a flow chart of the method for charging the battery. In the embodiment, a microcomputer chip may be used to collect real-time data of the current and the temperature every 10 minutes through the voltammeter installed in the charger and the temperature sensor at the battery end. The current and temperature data within 10 minutes are collected. The data collected within 10 minutes is edited into a data matrix by the microcomputer chip, and then imported into the defined CNN. The data matrix is used as a training data set for the training of a deep learning model. According to the set thresholds (for example, the current threshold is 3 A and the allowable error is 0.25 A, the temperature threshold is 60 degrees and the allowable error is 1 degree), the deep learning model training process is guided and the feed-forward neural network parameters are updated and iterated. When the error conditions are met, the current training process is stopped, and the network parameters of the current neural network are temporarily solidified and stored in the model file. Then, the microcomputer chip reads the network parameters in the model file, makes a variable resistance adjustment strategy, and adjusts the variable resistance value, so that the current value and the voltage value of the rechargeable battery are kept in a stable value. And the temperature of the battery is stabilized, the battery overheating is avoided.

Figure 4:
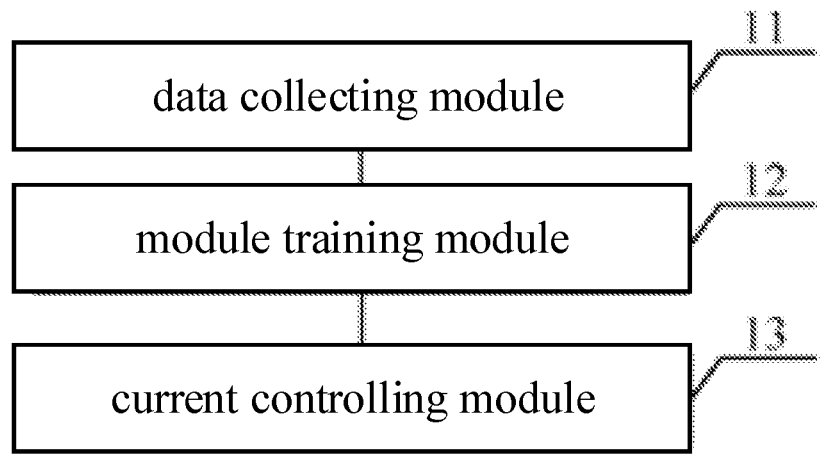
FIG. 4 is a schematic diagram showing the structure of the apparatus for charging the battery disclosed in the present disclosure.

Referring to FIG. 4, the embodiments of the present disclosure disclose an apparatus for charging a battery, including:
  a data collecting module 11 configured for collecting, at preset time intervals, battery charging state data of a rechargeable battery within each of the preset time intervals in real time; wherein the battery charging state data at least includes charging current data;
  a module training module 12 configured for, after the battery charging state data within any one of the preset time intervals are collected, regarding the battery charging state data within the preset time interval as a training data set and inputting into an initial neural network model for training; and in the process of training, updating a preset network parameter based on a difference between a model output value corresponding to each piece of the battery charging state data and a preset threshold, until the difference between the model output value corresponding to current battery charging state data and the preset threshold meets a preset error condition, and then regarding a current preset network parameter as a target parameter; and
  a current controlling module 13 configured for controlling charging current flowing into the rechargeable battery according to the target parameter;

It may be seen that in the embodiments of the present disclosure, at preset time intervals, battery charging state data of a rechargeable battery is collected within each of the preset time intervals in real time; wherein the battery charging state data at least includes charging current data; when the battery charging state data within any one of the preset time intervals is collected, the battery charging state data within the preset time interval is regarded as a training data set and input into an initial neural network model for training; and in the process of training, a preset network parameter is updated based on a difference between a model output value corresponding to each piece of the battery charging state data and a preset threshold, until the difference between the model output value corresponding to current battery charging state data and the preset threshold meets a preset error condition, and then a current preset network parameter is regarded as a target parameter; and charging current flowing into the rechargeable battery is controlled according to the target parameter. In other words, in the present disclosure, at the preset time intervals, the battery charging state data is collected in real time and the battery charging state data training model within each of the preset time intervals is used to obtain the network parameters corresponding to the rechargeable battery state data in this period. According to the network parameters, the charging current flowing into the rechargeable battery is controlled. In this way, the network parameters are obtained according to the data training model collected in real time, and the charging current flowing into the rechargeable battery is controlled in real time according to the network parameters, which is capable of stabilizing the charging current, thus the life of the battery and the safety of charging are improved.

The current controlling module 13 is configured for adjusting a variable resistance according to the target parameter to control the charging current flowing into the rechargeable battery.

In an embodiment, the data collecting module 11 is configured for collecting, at the preset time intervals, the charging current data and the battery temperature data of the rechargeable battery within each of the preset time intervals in real time.

Accordingly, the module training module 12 is configured for when collecting the charging current data and battery temperature data within any one of the preset time intervals, regarding the charging current data and the battery temperature data within the preset time interval as the training data set, inputting into the initial neural network model for training, and in the process of training, updating a preset network current parameter based on a difference between the model output value corresponding to each piece of the charging current data and a preset current threshold, and updating a preset network temperature parameter based on a difference between the model output value corresponding to each of the battery temperature data and a preset temperature threshold, until the difference between the model output value corresponding to current charging current data and the preset current threshold meets a preset current error condition, and the difference between the model output value corresponding to the current battery temperature data and the preset temperature threshold meets a preset temperature error condition, and then regarding a current preset network current parameter as a target current parameter and regarding a current preset network temperature parameter as a target temperature parameter.

Accordingly, the current controlling module 13 is configured for adjusting a first variable resistance according to the target current parameter to control current flowing into the rechargeable battery; and adjusting a second variable resistance according to the target temperature parameter to control a temperature of the rechargeable battery.

In an embodiment, the current controlling module 13 is configured for determining a difference between the target current parameter and the preset current threshold, and adjusting the first variable resistance according to the difference to control the current flowing into the rechargeable battery; and determining a difference between the target temperature parameter and the preset temperature threshold, adjusting the second variable resistance according to the difference to control the temperature of the rechargeable battery.

The apparatus further includes a parameter storage module configured for storing the target parameter to a preset model file.

Accordingly, the current controlling module 13 is configured for reading the target parameter from the preset model file and according to the target parameter, controlling the charging current flowing into the rechargeable battery.

The module training module 12 is configured for after the battery charging state data within any one of the preset time intervals are collected, constructing the battery charging state data within the preset time interval as a data matrix, and regarding the data matrix as the training data set.

Figure 5:
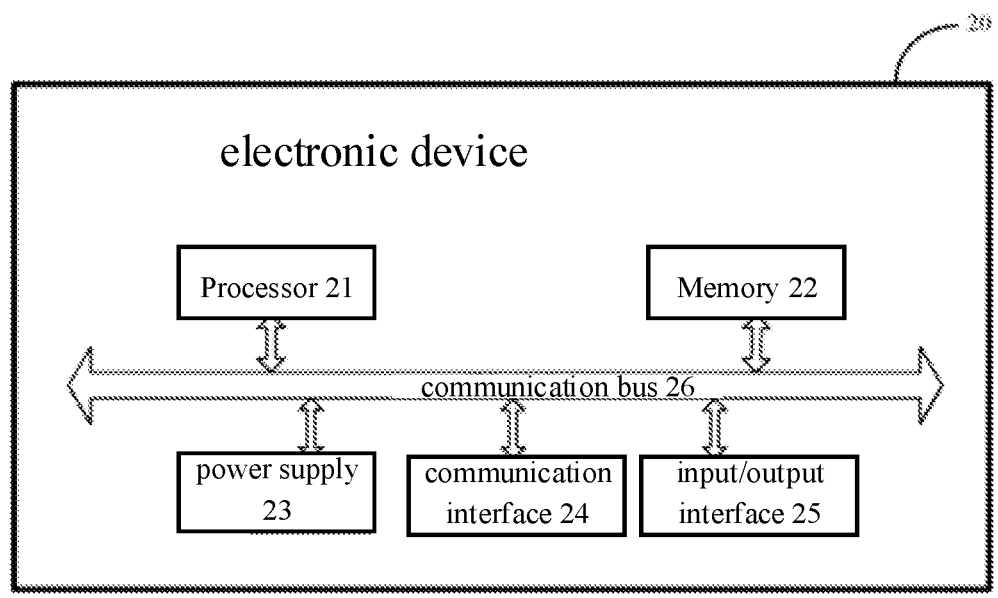
FIG. 5 is a schematic diagram showing the structure of the electronic device disclosed in the present disclosure.

Referring to FIG. 5, the embodiments of the present disclosure disclose an electronic device 20, including: a processor 21 and a memory 22, wherein the memory 22 is configured for saving a computer program; and the processor 21 is configured for executing the computer program to implement the method for charging the battery stated above.

The process of the method for charging the battery stated above may be referred to the corresponding contents disclosed in the embodiments stated above, and which are not repeated here.

And, the memory 22, as a resource storage carrier, may be a read-only memory, a random access memory, a disk or a CD, the storage mode may be short-term storage or permanent storage.

In addition, the electronic device 20 also includes a power supply 23, a communication interface 24, an input/output interface 25 and a communication bus 26. The power supply 23 is configured to provide working voltage for the hardware devices on the electronic device 20. The communication interface 24 may create a data transmission channel between the electronic device 20 and the external devices of the electronic device 20, and the communication protocol it follows is any communication protocol applicable to the technical solution of the present disclosure, and which is not limited herein. The input/output interface 25 is configured to obtain external input data or output data to the outside world. The type of the interface may be selected according to the application needs, and which is not specified here.

Further, the embodiments of the present disclosure also disclose a computer-readable storage medium, wherein the computer-readable storage medium is configured for saving a computer program, the computer program, when executed by a processor, implements the method for charging the battery stated above.

The process of the method for charging the battery stated above may be referred to the corresponding contents disclosed in the preceding embodiments, and which is not repeated here.

Embodiments in the specification is described in a progressive way. Each embodiment focuses on the differences from other embodiments. The same and similar parts between embodiments may be seen in each other. For the device disclosed in the embodiment, because it corresponds to the method disclosed in the present embodiment, the description is relatively simple, and the relevant places may be seen in the method section.

The steps of the method or algorithm described in combination with the embodiment described in the specification may be directly implemented by hardware, software modules executed by the processor, or a combination of the two. Software modules may be placed in random access memory (RAM), memory, read-only memory (ROM), electrically programmable ROM, electrically erasable programmable ROM, register, hard disk, removable disk, CD-ROM, or any other form of storage medium known in the art.

The method for charging the battery, the apparatus, the device and the medium provided by the present application is introduced in detail. In this paper, examples are used to explain the principle and implementation of the present application. The above embodiment is only used to help understand the method of this application and its core ideas. At the same time, for the general technical personnel in the art, according to the idea of the present, there may be changes in the implementation and scope of application. In a word, the content of the specification should not be understood as a limitation of the present application.

The invention claimed is:

1. A method for charging a battery, comprising:
collecting, at preset time intervals, battery charging state data of a rechargeable battery within each of the preset time intervals in real time; wherein the battery charging state data at least comprises charging current data;
after the battery charging state data within any one of the preset time intervals are collected, regarding the battery charging state data within the preset time interval as a training data set and inputting into an initial neural network model for training; and in the process of training, updating a preset network parameter based on a difference between a model output value corresponding to each piece of the battery charging state data and a preset threshold, until the difference between the model output value corresponding to current battery charging state data and the preset threshold meets a preset error condition, and then regarding a current preset network parameter as a target parameter; and
controlling charging current flowing into the rechargeable battery according to the target parameter;
wherein, after the battery charging state data within any one of the preset time intervals are collected, regarding the battery charging state data within the preset time interval as the training data set and inputting into the initial neural network model for training, and in the process of training, updating the preset network parameter based on the difference between the model output value corresponding to each piece of the battery charging state data and the preset threshold, until the difference between the model output value corresponding to current battery charging state data and the preset threshold meets the preset error condition, and then regarding the current preset network parameter as the target parameter comprises:

after the charging current data and battery temperature data within any one of the preset time intervals are collected, regarding the charging current data and the battery temperature data within the preset time interval as the training data set, inputting into the initial neural network model for training, and in the process of training, updating a preset network current parameter based on a difference between the model output value corresponding to each piece of the charging current data and a preset current threshold, and updating a preset network temperature parameter based on a difference between the model output value corresponding to each of the battery temperature data and a preset temperature threshold, until the difference between the model output value corresponding to current charging current data and the preset current threshold meets a preset current error condition, and the difference between the model output value corresponding to the current battery temperature data and the preset temperature threshold meets a preset temperature error condition, and then regarding a current preset network current parameter as a target current parameter and regarding a current preset network temperature parameter as a target temperature parameter.

2. The method for charging the battery according to claim 1, wherein controlling the charging current flowing into the rechargeable battery according to the target parameter comprises:
adjusting a variable resistance according to the target parameter to control the charging current flowing into the rechargeable battery.

3. The method for charging the battery according to claim 2, wherein adjusting the variable resistance according to the target parameter to control the charging current flowing into the rechargeable battery comprises:
adjusting a first variable resistance according to the target current parameter to control current flowing into the rechargeable battery; and
adjusting a second variable resistance according to the target temperature parameter to control a temperature of the rechargeable battery.

4. The method for charging the battery according to claim 3, wherein adjusting the first variable resistance according to the target current parameter to control the current flowing into the rechargeable battery; and adjusting the second variable resistance according to the target temperature parameter to control the temperature of the rechargeable battery comprise:
determining a difference between the target current parameter and the preset current threshold, and adjusting the first variable resistance according to the difference to control the current flowing into the rechargeable battery; and
determining a difference between the target temperature parameter and the preset temperature threshold, and adjusting the second variable resistance according to the difference to control the temperature of the rechargeable battery.

5. The method for charging the battery according to claim 4, wherein after determining the difference between the target current parameter and the preset current threshold, the method further comprises:
comparing the difference between the target current parameter and the preset current threshold with a preset first difference threshold;
when the target current parameter is greater than the preset current threshold and the difference between the target current parameter and the preset current threshold is greater than the preset first difference threshold, increasing a resistance value of the first variable resistance; and
when the target current parameter is less than the preset current threshold, and the difference between the target current parameter and the preset current threshold is greater than a preset difference condition, lowering the resistance value of the first variable resistance.

6. The method for charging the battery according to claim 4, wherein after determining the difference between the target temperature parameter and the preset temperature threshold, the method further comprises:
comparing the difference between the target temperature parameter and the preset temperature threshold with a preset second difference threshold;
when the target temperature parameter is greater than the preset temperature threshold and the difference between the target temperature parameter and the preset temperature threshold is greater than the preset second difference threshold, increasing a resistance value of the second variable resistance.

7. The method for charging the battery according to claim 1, wherein after regarding the current preset network parameter as the target parameter, the method further comprises:
storing the target parameter to a preset model file;
accordingly, according to the target parameter, controlling the charging current flowing into the rechargeable battery comprises:
reading the target parameter from the preset model file and according to the target parameter, controlling the charging current flowing into the rechargeable battery.

8. The method for charging the battery according to claim 1, wherein after the battery charging state data within any one of the preset time intervals are collected, regarding the battery charging state data within the preset time interval as the training data set comprises:
after the battery charging state data within any one of the preset time intervals are collected, constructing the battery charging state data within the preset time interval as a data matrix, and regarding the data matrix as the training data set.

9. The method for charging the battery according to claim 1, wherein collecting, at the preset time intervals, the battery charging state data of the rechargeable battery within each of the preset time intervals in real time comprises:
collecting, at the preset time intervals, the charging current data and the battery temperature data of the rechargeable battery within each of the preset time intervals in real time.

10. An electronic device, comprising:
a memory configured for saving a computer program; and
a processor configured for executing the computer program to implement the method for charging the battery according to claim 1.

11. The electronic device according to claim 10, wherein controlling the charging current flowing into the rechargeable battery according to the target parameter comprises:
adjusting a variable resistance according to the target parameter to control the charging current flowing into the rechargeable battery.

12. The electronic device according to claim 11, wherein adjusting the variable resistance according to the target parameter to control the charging current flowing into the rechargeable battery comprises:

adjusting a first variable resistance according to the target current parameter to control current flowing into the rechargeable battery; and adjusting a second variable resistance according to the target temperature parameter to control a temperature of the rechargeable battery.

13. The electronic device according to claim 12, wherein adjusting the first variable resistance according to the target current parameter to control the current flowing into the rechargeable battery; and adjusting the second variable resistance according to the target temperature parameter to control the temperature of the rechargeable battery comprise:

determining a difference between the target current parameter and the preset current threshold, and adjusting the first variable resistance according to the difference to control the current flowing into the rechargeable battery; and determining a difference between the target temperature parameter and the preset temperature threshold, adjusting the second variable resistance according to the difference to control the temperature of the rechargeable battery.

14. The electronic device according to claim 10, wherein after regarding the current preset network parameter as the target parameter, the method further comprises:

storing the target parameter to a preset model file;

accordingly, according to the target parameter, controlling the charging current flowing into the rechargeable battery comprises:

reading the target parameter from the preset model file and according to the target parameter, controlling the charging current flowing into the rechargeable battery.

15. The electronic device according to claim 10, wherein after the battery charging state data within any one of the preset time intervals are collected, regarding the battery charging state data within the preset time interval as the training data set comprises:

after the battery charging state data within any one of the preset time intervals are collected, constructing the battery charging state data within the preset time interval into a data matrix, and regarding the data matrix as the training data set.

16. The electronic device according to claim 10, wherein collecting, at the preset time intervals, the battery charging state data of the rechargeable battery within each of the preset time intervals in real time comprises: collecting, at the preset time intervals, the charging current data and the battery temperature data of the rechargeable battery within each of the preset time intervals in real time.

17. A computer-readable storage medium, wherein the computer-readable storage medium is configured for saving a computer program, the computer program, when executed by a processor, implements the method for charging the battery according to claim 1.

18. The computer-readable storage medium according to claim 17, wherein controlling the charging current flowing into the rechargeable battery according to the target parameter comprises:

adjusting a variable resistance according to the target parameter to control the charging current flowing into the rechargeable battery.

19. The computer-readable storage medium according to claim 18, wherein adjusting the variable resistance according to the target parameter to control the charging current flowing into the rechargeable battery comprises:

adjusting a first variable resistance according to the target current parameter to control current flowing into the rechargeable battery; and adjusting a second variable resistance according to the target temperature parameter to control a temperature of the rechargeable battery.

20. The computer-readable storage medium according to claim 19, wherein adjusting the first variable resistance according to the target current parameter to control the current flowing into the rechargeable battery; and adjusting the second variable resistance according to the target temperature parameter to control the temperature of the rechargeable battery comprise:

determining a difference between the target current parameter and the preset current threshold, and adjusting the first variable resistance according to the difference to control the current flowing into the rechargeable battery; and determining a difference between the target temperature parameter and the preset temperature threshold, adjusting the second variable resistance according to the difference to control the temperature of the rechargeable battery.

* * * * *